United States Patent
Sihler et al.

(10) Patent No.: US 9,143,029 B2
(45) Date of Patent: Sep. 22, 2015

(54) SYSTEM AND METHOD FOR POWER DISTRIBUTION

(75) Inventors: Christof Sihler, Hallbergmoos (DE); Sebastian Pedro Rosado, Munich (DE)

(73) Assignee: General Electric Company, Niskayuna, NY (US)

( * ) Notice: Subject to any disclaimer, the term of this patent is extended or adjusted under 35 U.S.C. 154(b) by 879 days.

(21) Appl. No.: 13/326,919

(22) Filed: Dec. 15, 2011

(65) Prior Publication Data

US 2013/0154349 A1   Jun. 20, 2013

(51) Int. Cl.
  *B60L 1/00*   (2006.01)
  *H02M 1/32*   (2007.01)
  *H02J 1/08*   (2006.01)

(52) U.S. Cl.
  CPC ... *H02M 1/32* (2013.01); *H02J 1/08* (2013.01)

(58) Field of Classification Search
  USPC ......................................... 307/9.1
  See application file for complete search history.

(56) References Cited

U.S. PATENT DOCUMENTS

| | | | |
|---|---|---|---|
| 3,398,324 A | 8/1968 | Cavanaugh | |
| 4,766,724 A | 8/1988 | Gruber | |
| 4,788,448 A | 11/1988 | Crowe | |
| 6,664,656 B2 * | 12/2003 | Bernier | 307/9.1 |
| 7,098,555 B2 * | 8/2006 | Glahn et al. | 307/32 |
| 7,550,866 B2 * | 6/2009 | Breit et al. | 307/9.1 |
| 7,598,625 B2 | 10/2009 | Yu et al. | |
| 7,759,821 B2 | 7/2010 | Lando et al. | |
| 7,851,943 B2 * | 12/2010 | Datta et al. | 307/38 |
| 7,868,621 B2 | 1/2011 | Liu et al. | |
| 8,657,227 B1 * | 2/2014 | Bayliss et al. | 244/58 |
| 2008/0284249 A1 | 11/2008 | Datta et al. | |
| 2008/0303353 A1 | 12/2008 | Yu et al. | |
| 2009/0146603 A1 * | 6/2009 | Sihler et al. | 318/812 |
| 2010/0133901 A1 * | 6/2010 | Zhang et al. | 307/11 |
| 2010/0156174 A1 | 6/2010 | Nierlich et al. | |
| 2011/0057724 A1 * | 3/2011 | Pabon | 327/581 |

FOREIGN PATENT DOCUMENTS

| | | |
|---|---|---|
| GB | 2420233 A | 5/2006 |
| GB | 2466871 A | 7/2010 |

(Continued)

OTHER PUBLICATIONS

Jin et al., "Solid-State Over-Current Protection for Industrial DC Distribution Systems", 4th International Energy Conversion Engineering Conference, pp. AIAA-2006-4023, Jun. 26-29, 2006, San Diego, California.

*Primary Examiner* — Jared Fureman
*Assistant Examiner* — Duc M Pham
(74) *Attorney, Agent, or Firm* — John P. Darling (57) ABSTRACT

A direct current (DC) power distribution system is provided for an aircraft. The system includes a DC system bus configured to carry electrical power from a source of electrical power to a plurality of electrical loads. The electrical loads are onboard the aircraft. The DC system bus includes a load side. The system includes a plurality of power converter modules that are electrically coupled in series to the DC system bus on the load side of the DC system bus. The power converter modules are configured to be electrically attached to corresponding sub-sets of the electrical loads. At least one of the power converter modules is configured to be short circuited in response to a fault such that the at least one power converter module does not supply electrical power to the corresponding subset of the electrical loads.

11 Claims, 6 Drawing Sheets

(56) References Cited

FOREIGN PATENT DOCUMENTS

| WO | 0074198 | A1 | 12/2000 |
| WO | 0152379 | A2 | 7/2001 |
| WO | 2008002226 | A1 | 1/2008 |

\* cited by examiner

SYSTEM AND METHOD FOR POWER DISTRIBUTION

BACKGROUND

Many types of aircraft, such as aerostats, fixed wing aircraft, powered lift aircraft, and rotorcraft, include power distribution systems for distributing electrical power to various electrical loads onboard the aircraft. The demand for electrical power provided by power distribution systems onboard aircraft continues to increase. The increased demand may be based on an increased number of electrical loads and/or an increase in the amount of electrical power consumed by electrical loads onboard the aircraft. For example, electrical starter-generators, electrically powered environmental control and pressurization systems, electrically actuated flight controls, electrical engine and flight management systems, and electrical anti-ice and de-ice systems are electrical loads that have been added relatively recently onboard aircraft. New electrical loads have also been added to passenger aircraft to increase comfort standards and/or to provide the passengers with more entertainment and/or other services. Moreover, as electrical loads become more advanced, for example to include more features and/or capability, the electrical loads consume a greater amount of electrical power.

At least some known aircraft include alternating current (AC) power distribution systems that distribute AC power to the various electrical loads onboard the aircraft. However AC power distribution systems are not without disadvantages. For example, many of the electrical loads onboard an aircraft, if not a majority, are direct current (DC) loads that are configured to operate using DC. Accordingly, power conversion stages must be provided at each DC load to convert the AC power provided by the AC power distribution system to DC power that can be used by the DC load. However, the power conversion stages provided at each of the DC loads to convert from AC power to DC power increase the weight, size, and number of components of the power distribution system. Moreover, the power conversion stages provided at each of the DC loads to convert from AC power to DC power may decrease the reliability and/or maintainability of the power distribution system.

BRIEF DESCRIPTION

In one embodiment, a direct current (DC) power distribution system is provided for an aircraft. The system includes a DC system bus configured to carry electrical power from a source of electrical power to a plurality of electrical loads. The electrical loads are onboard the aircraft. The DC system bus includes a load side. The system includes a plurality of power converter modules that is electrically coupled in series to the DC system bus on the load side of the DC system bus. The power converter modules are configured to be electrically attached to corresponding sub-sets of the electrical loads. At least one of the power converter modules is configured to be short circuited in response to a fault such that the at least one power converter module does not supply electrical power to the corresponding subset of the electrical loads.

In another embodiment, an aircraft includes an airframe, a source of electrical power onboard the airframe, a plurality of electrical loads onboard the airframe, and a direct current (DC) power distribution system. The DC power distribution system includes a DC system bus having a source side and a load side. The DC system bus is electrically coupled to the source on the source side. A plurality of power converter modules is electrically attached to corresponding subsets of the electrical loads. The power converter modules are electrically coupled in series to the DC system bus on the load side for carrying electrical power from the DC system bus to the electrical loads. At least one of the power converter modules is configured to be short circuited in response to a fault such that the at least one power converter module does not supply electrical power to the corresponding sub-set of the electrical loads.

In yet another embodiment, a direct current (DC) power distribution system is provided for an aircraft. The system includes a DC system bus configured to carry electrical power from a source of electrical power to a plurality of electrical loads. The electrical loads are onboard the aircraft. The DC system bus has a load side. A plurality of power converter modules is electrically coupled in series to the DC system bus on the load side of the DC system bus. The power converter modules are configured to be electrically attached to corresponding sub-sets of the electrical loads. The system also includes a controller electrically coupled to the DC system bus. The controller is configured to maintain an electrical current of the DC system bus at a commanded value.

DETAILED DESCRIPTION

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide direct current (DC) power distribution systems for aircraft. For example, various embodiments of DC power distribution systems and aircraft include power converter modules that are configured to be short circuited in response to a fault. Moreover, and for example, various embodiments of DC power distribution systems and aircraft include a controller that is configured to maintain an electrical current of a DC system bus at a commanded value. At least one technical effect of various embodiments is a power distribution system that takes up less space and/or that has a reduced cost, a reduced complexity, a reduced number of components, and/or an increased efficiency. At least one other technical effect of various embodiments is the elimination of one or more DC circuit breakers from a power distribution system.

The various embodiments of DC power distribution systems may be implemented within any type of aircraft. Embodiments of DC power distribution systems are described and illustrated herein with respect to a fixed wing airplane. However, the various embodiments of DC power distribution systems described and/or illustrated herein are not limited to fixed wing airplanes, but rather the various embodiments of DC power distribution systems described and/or illustrated herein may be used with any other type of aircraft having any other design, structure, configuration, arrangement, and/or the like, such as, but not limited to, aerostats, powered lift aircraft, and/or rotorcraft, among others.

Figure 1:
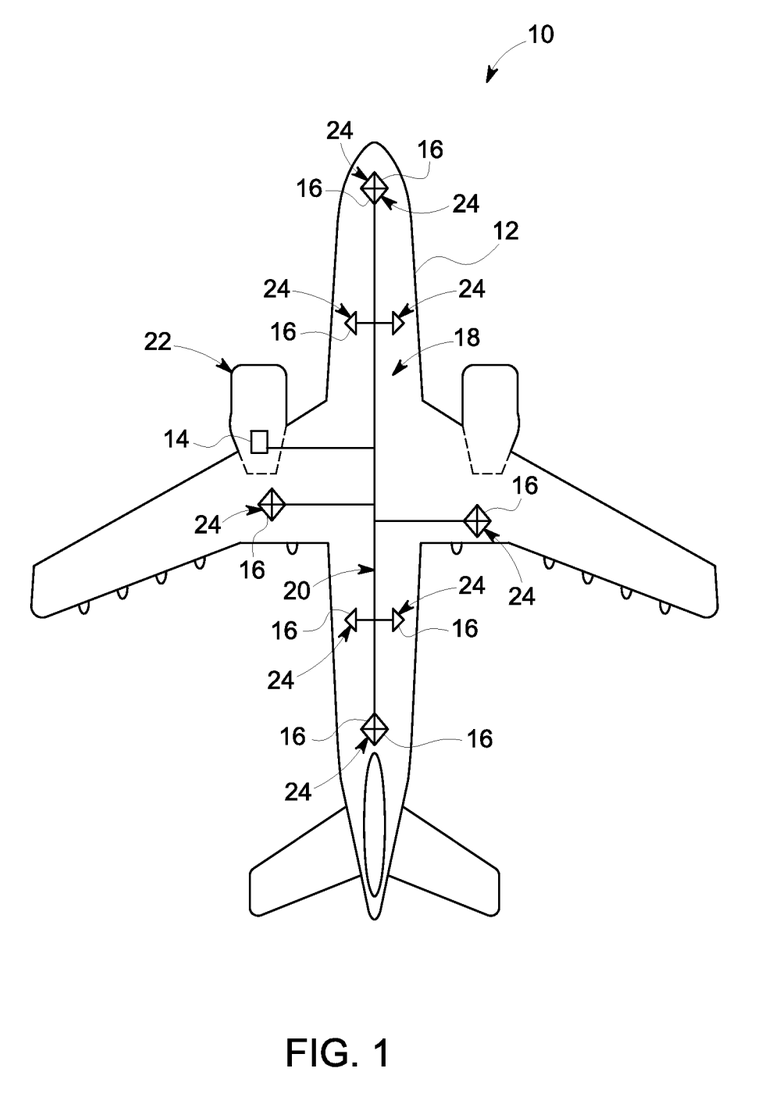
FIG. 1 is a schematic illustration of an embodiment of an aircraft.

FIG. 1 is a schematic illustration of an embodiment of an aircraft 10. In the illustrated embodiment, the aircraft 10 is a fixed wing passenger airplane. The aircraft 10 includes an airframe 12, a source 14 of electrical power, a plurality of electrical loads 16, and a DC power distribution system 18. The source 14 and the electrical loads 16 are onboard the airframe 12. Specifically, the source 14 and the electrical loads 16 are positioned at various locations on and/or within the airframe 12 such that the source 14 and the electrical loads 16 are carried by the airframe 12 during flight of the aircraft 10. The DC power distribution system 18 includes a DC system bus 20 that is configured (e.g., operatively connected between the source 14 and the electrical loads 16) to carry electrical power from the source 14 to the electrical loads 16. Various embodiments of the DC power distribution system 18 will be described in more detail below.

The source 14 may be any type of source of electrical power, for example a generation device or a storage device. In the illustrated embodiment, the source 14 is a turbine generator that is associated with an engine 22 of the aircraft 10. Other examples of the source 14 as a generation device include electrical generators and/or solar cells, among others. Examples of the source 14 as a storage device include fuel cells, batteries, flywheels, and/or capacitors, among others. In the illustrated embodiment, the source 14 of electrical power is a source of alternating current (AC) power. Alternatively, the source 14 is a source of DC power. Although shown as being located at the engine 22 of the aircraft 10, the source 14 may be located at any other location along the airframe 12. Moreover, although only one is shown, the aircraft 10 may include any number of the sources 14. When the aircraft 10 includes a plurality of sources 14, each source 14 may be any type of source, may be located at any location along the airframe 12, may be a DC or an AC power source, and/or may or may not be operatively connected to the DC power distribution system 18 for supplying the electrical loads 16 with electrical power.

Sub-sets 24 of the electrical loads 16 are shown in FIG. 1 at various locations along the airframe 12. Each sub-set 24 may include any number of electrical loads 16. In some embodiments, one or more sub-sets 24 only includes a single electrical load 16. When a sub-set 24 includes two or more electrical loads 16, all of the electrical loads 16 of the sub-set 24 may be of the same type or the sub-set 16 may include two or more different types of electrical loads 16.

The locations and pattern of sub-sets 24 along the airframe 12 shown in FIG. 1 are for example only. Each sub-set 24 may have any other location along the airframe 12 and the sub-sets 24 may be arranged in any other pattern relative to each other. Moreover, the electrical loads 16 of the same sub-set 24 are shown in FIG. 1 as grouped together at the same location along the airframe 12 for illustrative purposes only. The electrical loads 16 of the same sub-set 24 need not be located at the same location along the airframe 12. Rather, each electrical load 16 may have any location along the airframe 12, whether or not such location is the same, or adjacent to, the location of one or more other electrical loads 16 of the same sub-set 24. In other words, the electrical loads 12 are not grouped together in the sub-sets 24 based on the locations of the electrical loads 12. Rather, the electrical loads 16 are grouped together in the sub-sets 24 based on corresponding power converter modules 26 (shown in FIG. 2) of the DC power distribution system 18 that are common to groups (i.e., the sub-sets 24) of the electrical loads 16. The aircraft 10 may include any number of the sub-sets 24. The electrical loads 16 within each sub-set 24 may be electrically coupled to the corresponding power converter module 26 in series, parallel, and/or a combination thereof relative to each other. The power converter modules 26 may also be referred to herein as "load power converter modules".

Each electrical load 16 of each sub-set 24 may be any type of electrical load. Examples of the electrical loads 16 include flight controls, avionics, displays, instruments, sensors, galley ovens, heaters, refrigeration units, lighting, fans, de-ice and anti-ice systems, engine management systems, flight management systems, starters, starter-generators, environmental controls, pressurization systems, entertainment systems, microwaves, weapon systems, and/or cameras, among others. Each electrical load 16 of each sub-set 24 may be a DC load or an AC load. When a sub-set 24 includes a plurality of the electrical loads 16, all of the electrical loads 16 of the sub-set 24 are DC loads or all of the electrical loads 16 of the sub-set 24 are AC loads.

The aircraft 10 may include other electrical loads (not shown), besides the electrical loads 16, that are not operatively connected to the DC power distribution system 18. For example, the aircraft 12 may include other power distribution systems (not shown) that receive electrical power from the source 14 and/or from other sources of electrical power onboard the aircraft 10 to supply such other electrical loads with electrical power.

Figure 2:
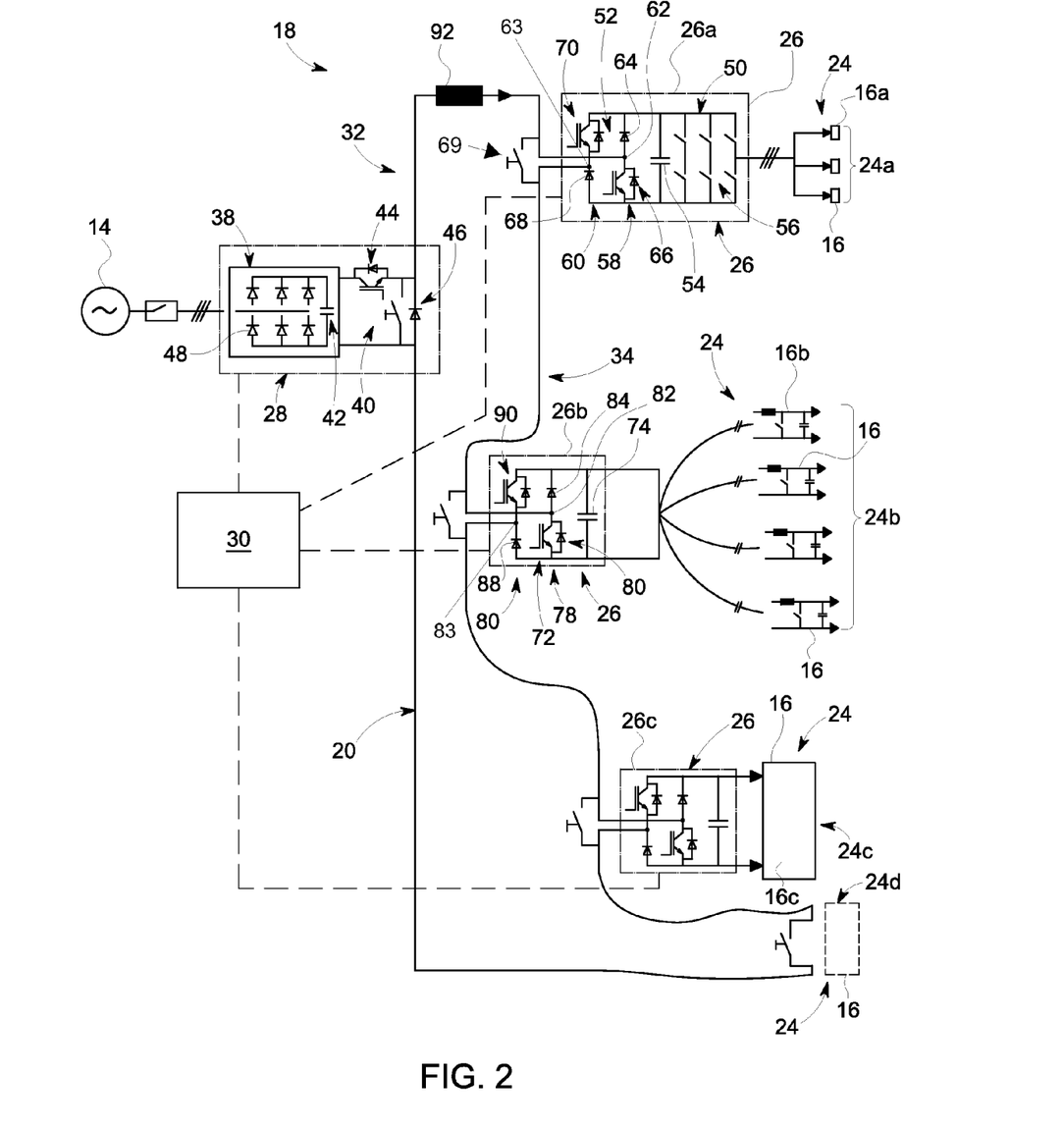
FIG. 2 is a circuit diagram illustrating an embodiment of a direct current (DC) power distribution system of the aircraft shown in FIG. 1.

FIG. 2 is a circuit diagram illustrating an embodiment of the DC power distribution system 18. The system 18 includes the DC system bus 20, a power converter module 28, and one or more of the power converter modules 26. The system 18 may also include a controller 30. The DC system bus 20 includes a source side 32 and a load side 34. The DC system bus 20 is electrically coupled to the source 14 on the source side 32 for receiving electrical power from the source 14. Specifically, the DC system bus 20 is electrically coupled to the source 14 through the power converter module 28, which is electrically coupled between the source 14 and the source side 32 of the DC system bus 20. The power converter module 28 is electrically coupled in series to the DC system bus 20 for carrying electrical power from the source 14 to the DC system bus 20.

The power converter modules 26 are electrically coupled in series to the DC system bus 20 on the load side 34 of the DC system bus 20. The power converter modules 26 are electrically attached to corresponding sub-sets 24 of the electrical loads 16. In other words, each power converter module 26 is electrically coupled between the load side 34 of the DC system bus 20 and one or more corresponding sub-sets 24 of the electrical loads 16. The power converter modules 26 carry electrical power from the DC system bus 20 to the electrical loads 16 of the corresponding sub-set(s) 24.

The controller 30 may be electrically coupled to the DC system bus 20, the power converter module 28, and/or one or more of the power converter modules 26 for controlling operation of the DC system bus 20, the power converter module 28, and/or one or more of the power converter modules 26. The DC system bus 20 and the series couplings to the DC system bus 20 form a DC ring along which DC current flows. As will be described in more detail below, the controller 30 may be configured to maintain an electrical current of the DC ring at a commanded value. At least one of the power converter modules 26 may be configured to be short circuited in response to a fault to bypass the supply of electrical power to the corresponding sub-set 24 of the electrical loads 16, as will also be described below. In some embodiments, the controller 30 is not directly electrically coupled to one or more of the power converter modules 26, but rather is electrically coupled to the power converter modules 26 through the power converter module 28 and/or the DC system bus 20.

In the illustrated embodiment, as described above, the source 14 is a source of AC power. The power converter module 28 includes an AC to DC converter 38 and a DC to DC converter 40. A connection 42 (illustrated as a capacitor) electrically couples the converters 38 and 40 together. The AC to DC converter 38 is electrically coupled to the source 14 and converts the AC power received from the source 14 to DC power. The DC to DC converter 40 is electrically coupled to the source side 32 of the DC system bus 20 for supplying the DC power converted by the AC to DC converter 38 to the DC system bus 20.

The DC to DC converter 40 includes two switches 44 and 46 in the illustrated embodiment. However, the DC to DC converter 40 may additionally or alternatively include other components, configurations, and/or the like in other embodiments. In the illustrated embodiment, the AC to DC converter 38 includes a plurality of diodes 48. However, the AC to DC converter 38 may additionally or alternatively include other components, configurations, and/or the like. For example, the AC to DC converter 38 may include one or more switches.

In the illustrated embodiment, the voltage supplied by the source 14 to the power converter module 28 is variable but the power converter module 28 delivers a substantially constant voltage to the DC system bus 20. Alternatively, the voltage supplied by the source 14 is substantially constant and/or the power converter module 28 delivers a variable voltage to the DC system bus 20. It is also possible, in some embodiments, that the voltage supplied by the source 14 to the power converter module 28 is variable and the power converter module 28 delivers a variable voltage to the DC system bus 20. The power converter module 28 may also be referred to herein as a "source power converter module".

In illustrated embodiment, four sub-sets 24a-24d of electrical loads 16 are electrically coupled in series to the DC system bus 20. However, any number of sub-sets 24 may be electrically coupled to the DC system bus 20. The sub-sets 24a-24c are electrically coupled to the DC system bus 20 through corresponding power converter modules 26a-26c, respectively. In the illustrated embodiment, the sub-set 24a includes a plurality of electrical loads 16a that are AC loads, the sub-set 24b includes a plurality of electrical loads 16b that are DC loads, and the sub-set 24c includes a single electrical load 16c that is a DC load. The electrical loads 16a of the sub-set 24a are electrically coupled to the corresponding power converter module 26a in parallel relative to each other, while the electrical loads 16b of the sub-set 24b are electrically coupled to the corresponding power converter modules 26b in series relative to each other. The sub-set 24d represents one or more other (whether AC or DC) electrical loads 16 that may be electrically coupled in series to the DC system bus 20. The sub-set 24d may or may not be electrically coupled to the DC system bus 20 through a corresponding power converter module (not shown).

The power converter module 26a includes a DC to AC converter 50 and a DC to DC converter 52. A connection 54 (illustrated as a capacitor) electrically couples the converters 50 and 52 together. The DC to AC converter 50 converts DC power received from the DC system bus 20 to AC power for use by the AC loads 16a. In the illustrated embodiment, the DC to AC converter 50 includes a plurality of switches 56. However, the DC to AC converter 50 may additionally or alternatively include other components, configurations, and/ or the like. For example, the DC to AC converter 50 may include one or more diodes (not shown).

The DC to DC converter 52 is used to control, or regulate, the voltage at the sub-set 24a of the electrical loads 16a. For example, the DC to DC converter 52 may adapt, or adjust, the voltage to the needs of the sub-set 24a of electrical loads 16a. Moreover, the DC to DC converter 52 may be used to short circuit the power converter module 26a, as will be described below. In the illustrated embodiment, the DC to DC converter 52 is a bridge converter. Specifically, the DC to DC converter 52 includes two diode-switch pairs 58 and 60 and two terminals 62 and 63. The diode-switch pair 58 includes a diode 64 and a switch 66, while the diode-switch pair 60 includes a diode 68 and a switch 70. The terminals 62 and 63 are configured to supply electrical power to the sub-set 24a of the electrical loads 16a through the diodes 64 and 68 when both switches 66 and 70 are open. The DC to DC converter 52 may additionally or alternatively include other components, configurations, and/or the like in other embodiments.

The power converter module 26b includes a DC to DC converter 72, which is used to control, or regulate, the voltage at the sub-set 24b of the electrical loads 16b. For example, the DC to DC converter 72 may adapt, or adjust, the voltage to the needs of the sub-set 24b of electrical loads 16b and/or the converter 72 may be used to short circuit the power converter module 26b. In addition or alternatively, the power converter module 26b is short circuited externally (e.g., using a switch 69). In the illustrated embodiment, the DC to DC converter 72 is a bridge converter, which includes two diode-switch pairs 78 and 80 and two terminals 82 and 83. The DC to DC converter 72 also includes a connection 74 (illustrated as a capacitor). The diode-switch pairs 78 and 80 have respective diodes 84 and 88 and respective switches 86 and 90. The terminals 82 and 83 are configured to supply electrical power to the sub-set 24b of the electrical loads 16b through the diodes 84 and 88 when both switches 86 and 90 are open. In addition or alternative to the illustrated embodiment, the DC to DC converter 72 may include other components, configurations, and/or the like in other embodiments.

The power converter module 26c is substantially similar to the power converter module 26b and therefore will not be described in more detail herein.

As described above, the controller 30 may be configured to maintain the electrical current flowing along the DC ring at a commanded value. In other words, the controller 30 may be configured to maintain the DC current of the DC system bus 20 at a commanded value. When the electrical current flowing along the DC system bus 20 is maintained at the commanded value, the value of the electrical current going into and coming out of each of the power converter modules 26 is approximately the same as that supplied from the power converter module 28. The commanded value may be any value. In some embodiments, the commanded value is a range of values. When the commanded value is a range and the electrical current flowing along the DC system bus 20 is maintained at the commanded value, the value of the electrical current remains within the range as supplied from the power converter module 28 and going into and coming out of each of the power converter modules 26. The commanded value may be adjusted from time-to-time during and/or between operating cycles of the system 18.

The commanded value may be selected as a suitable value for the amount of electrical power that is being used by the sub-sets 24 of the electrical loads 16. In some embodiments, the commanded value is selected to be the minimum needed to support the maximum current value used by any one of the power converter modules 26 to supply a desired amount of electrical power to the corresponding electrical loads 16. In other words, in some embodiments, the commanded value depends on the requirements, or demand, of the electrical loads 16. In some embodiments, the electrical loads 16 that are supplied with electrical power from the system 18 are selected as loads that consume a relatively similar amount of electrical power, such as, but not limited to, within approximately 20% each other or within approximately 10% of each other. Selecting loads that consume a relatively similar amount of electrical power may improve the efficiency of the system 18. For example, because the power converter modules 26 will operate in relatively similar conditions, the modules 26 can be optimized for the amount of electrical power being supplied and/or for the desired application.

In the illustrated embodiment, the controller 30 is configured to maintain the electrical current flowing along the DC system bus 20 at the commanded value using the power converter module 28. Specifically, the DC to DC converter 40 of the power converter module 28 is used to maintain the electrical current of the DC system bus 20 at the commanded value. Using the DC to DC converter 40, the controller 30 operates the switches 44 and 46 of the DC to DC converter 40 to drive the electrical current of the DC system bus 20 to the commanded value. A feed back loop may be used to enable the controller 30 to determine the commanded value.

At least one of the power converter modules 26 may be configured to be short circuited in response to a fault. When short circuited, a power converter module 26 does not supply electrical power to the corresponding electrical loads 16 (i.e., the loads 16 that are electrically attached to the particular power converter module 26). For example, the DC to DC converter (e.g., the converter 52 or the converter 72) of a particular power converter module 26 can bypass the supply of electrical power to the corresponding sub-set 24 of electrical loads 16 by providing a short circuit in the connection (e.g., the connection 54 or the connection 74) of the particular power converter module 26. The particular power converter module 26 is thereby bypassed along the DC system bus 20. The short circuit may be provided by changing the voltage to zero or any nominal value, such as, but not limited to, plus or minus approximately 270 Volts or less, or plus or minus approximately 700 Volts or less.

In the illustrated embodiment, the DC to DC converter of a particular power converter module 26 provides the short circuit in the connection by closing either of the switches (e.g., the switches 66, 70, 86, or 90) thereof. However, each of the DC to DC converters (e.g., the converters 52 and 72) of the power converter modules 26 may additionally or alternatively include any other components, configurations, and/or the like that enable the DC to DC converter to short circuit the corresponding power converter module 26. The controller 30 may be configured to send command signals to the DC to DC converters of the power converter modules 26 for controlling operation of the switches (e.g., the switches 66, 70, 86, or 90) thereof.

When a particular power converter module 26 is short circuited as described above, the electrical current of the DC system bus 20 is still supplied to the corresponding sub-set 24 of electrical loads 16. In some embodiments, the electrical current of the DC system bus 20 may still be supplied to a particular sub-set 24 of electrical loads 16 at the commanded value when the corresponding power converter module 26 is short circuited as described above. By short circuiting a particular power converter module 26 upon the occurrence of a fault, the controller 30 responds to the fault without interrupting the flow of electrical current to the sub-set 24 of electrical loads 16 that correspond to the particular power converter module 26. In other words, the controller 30 is configured to control a voltage of a particular power converter module 26 in response to a fault instead of interrupting the supply of electrical current to the sub-set 24 of electrical loads 16 that correspond to the particular power converter module 26.

Short circuiting a power converter module 26 in response to a fault may enable the elimination of one or more DC circuit breakers (not shown) from the system 18. DC circuit breakers may be relatively expensive, may be relatively complex, and/or may have reliability concerns. In some embodiments, the switches (e.g., the switches 66, 70, 86, or 90) of the DC to DC converters of the power converter modules 26 have less current interruption capability than a DC circuit breaker. Moreover, in some embodiments, the commanded value of the electrical current flowing along the DC system bus 20 is selected as a value that is low enough to enable the switches of the DC to DC converters of the power converter modules 26 to short circuit the corresponding power converter module 26. In other embodiments, the commanded value of the electrical current flowing along the DC system bus 20 does not affect the ability of the switches of the DC to DC converters of the power converter modules 26 to short circuit the corresponding power converter module 26. In some embodiments, a relatively quick action of the switches of the DC to DC converters of the power converter modules 26 enables better selectivity and/or coordination of protection actions in the system 18 when a fault occurs.

Each of the power converter modules 26 is configured to independently remain in operation when one or more other power converter modules 26 is bypassed (in a short circuit condition). In other words, one or more power converter modules 26 may supply electrical power to the corresponding sub-set 24 of electrical loads 16 when one or more other power converter modules 26 is short circuited. When one or more power converter modules 26 is bypassed, the voltage of the DC system bus 20 equals the sum of the voltages of the power converter modules 26 that remain in operation (i.e., have not been bypassed). The controller 30 may adjust the voltage delivered from the power converter module 28 to maintain the electrical current of the DC system bus 20 at the commanded value. Accordingly, the total amount of electrical power transmitted to the electrical loads 16 may be instantaneously, online, and/or dynamically adapted by adapting the voltage of the DC system bus 20.

The capability of individually bypassing one or more power converter modules 26 without interrupting operation of the remainder of the system 18 enables easier maintenance of the system 18. For example, by individually bypassing one or more power converter modules 26, the power converter modules 26 and/or other components of the system 18 can be withdrawn for maintenance, repair, and/or replacement while the remainder of the system 18 remains in operation. In addition or alternatively to short circuiting one or more power converter modules 26, the power converter module 28 may be capable of being short-circuited to enhance the bypass capability of the system 18. For example, the power converter module 28 may be short circuited (e.g., using a DC to DC converter of the module 28 that has a circuit topology that enables such a short circuit) to bypass all of the sub-sets 24 of electrical loads 16.

The DC ring formed by the DC system bus 20 and the series couplings thereto may be grounded through an impedance 92, for example to avoid interruptions from pole-to-earth faults. The impedance 92 may be of sufficient magnitude to provide insulation for the voltage difference across the DC system bus 20.

Although the DC power distribution system 18 is described herein with reference to only a single source 14, it should be understood that the system 18 may be electrically coupled to any number of sources for receiving electrical power therefrom. Moreover, the system 18 may include any number of the power converter modules 28 electrically coupled between the DC system bus 20 and the source 14 for carrying electrical power from the source 14 to the DC system bus 20. Although only one controller 30 is shown, the functions, operations, actions, and/or the like of the controller 30 described and/or illustrated herein may be performed by one or more other controllers in addition or alternative to the controller 30. For example, the power converter module 28 and/or one or more of the power converter modules 26 may include a controller (not shown) that performs one or more functions, operations, actions, and/or the like of the controller 30 described and/or illustrated herein.

Figure 3:
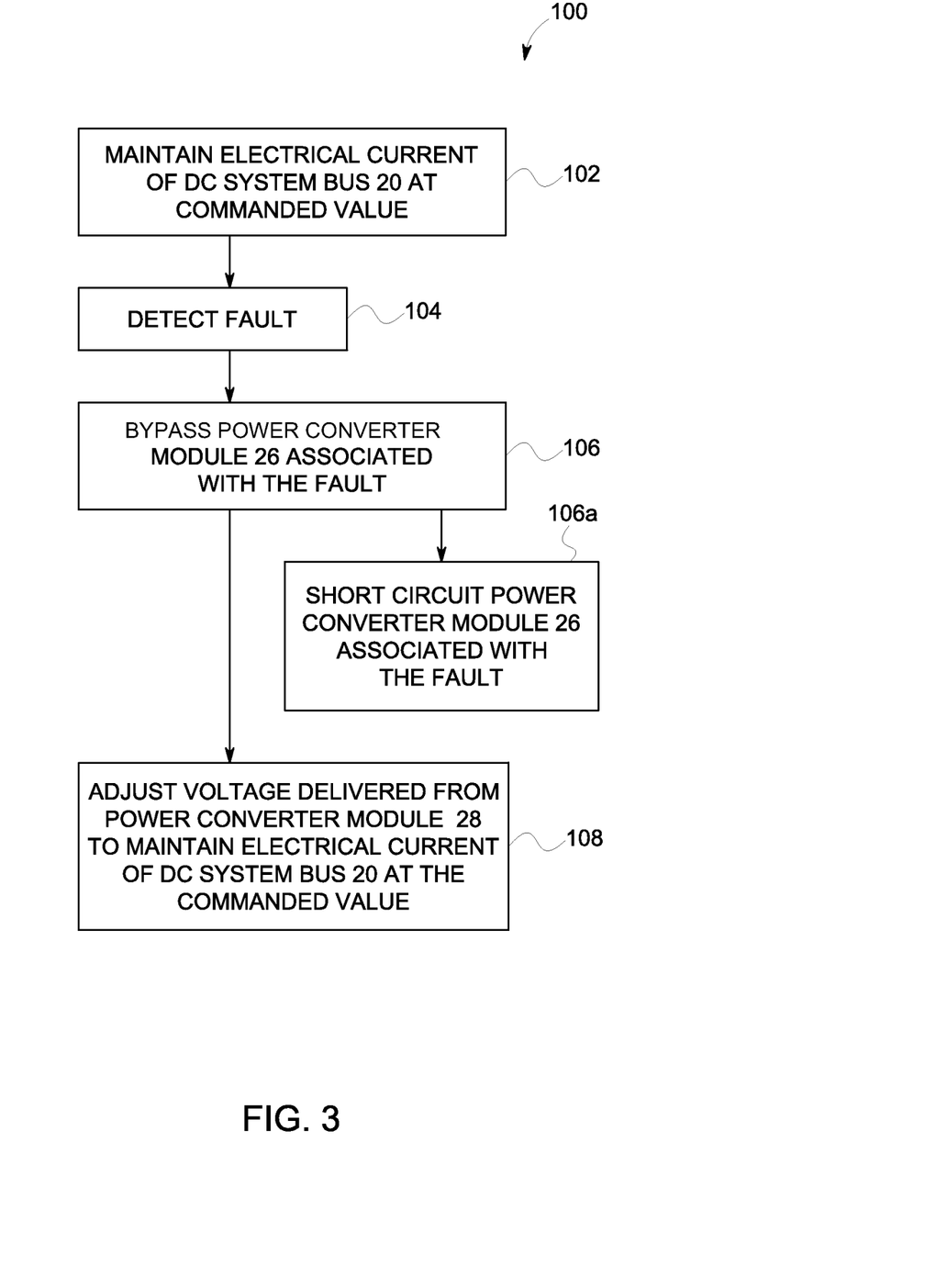
FIG. 3 is a flowchart illustrating an embodiment of a method for responding to a fault within the DC power distribution system shown in FIG. 2.

FIG. 3 is a flowchart illustrating an embodiment of a method 100 for responding to a fault within the DC power distribution system 18 (shown in FIG. 2). In some embodiments, the method 100 includes maintaining, at 102, an electrical current of the DC system bus 20 at a commanded value. For example, the controller 30 may maintain 102 the electrical current of the DC system bus 20 at the commanded value using the DC to DC converter 40 of the power converter module (all of which are shown in FIG. 2).

At 104, the method 100 includes detecting a fault. For example, a fault may be detected within an electrical load 16, within a power converter module 26, and/or within any other components of the system 18. The fault may be any type of fault, such as, but not limited to, a malfunction and/or a failure, among others. The controller 30 may detect the fault. Once a fault is detected at 104, the method 100 includes responding to the fault by bypassing, at 106, a power converter module 26 that is associated with the fault. By associated with the fault, it is meant that the fault occurred within the power converter module 26 and/or within a corresponding electrical load 16. Bypassing at 106 the power converter module 26 that is associated with the fault includes short circuiting, at 106a, the power converter module 26 that is associated with the fault. In some embodiments, the method 100 includes adjusting, at 108, the voltage delivered from the power converter module 28 to maintain the electrical current of the DC system bus 20 at the commanded value.

Figure 4:
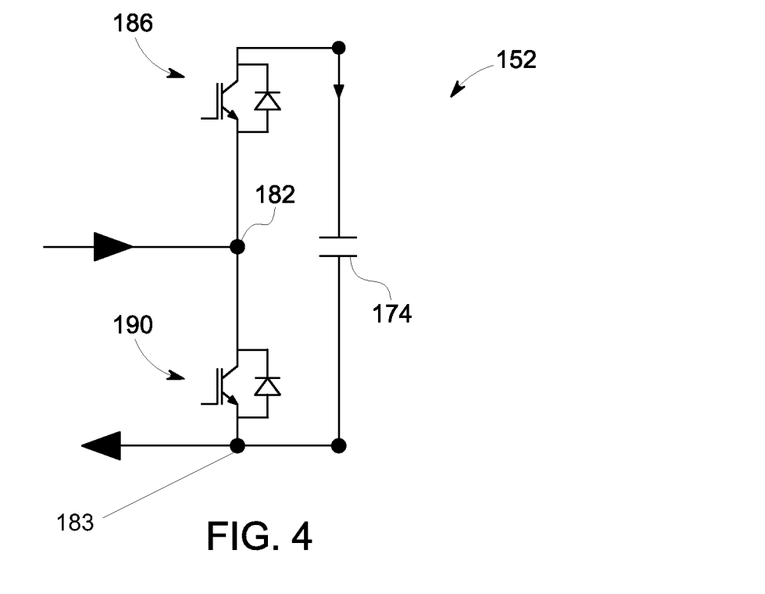
FIG. 4 is a circuit diagram illustrating another embodiment of a DC to DC converter for use with the system shown in FIG. 2.

FIG. 4 is a circuit diagram illustrating another embodiment of a DC to DC converter 152 for use within the power converter modules 26 (shown in FIG. 2). For example, the DC to DC converter 152 may be used in place of the DC to DC converter 52 (shown in FIG. 2) or the DC to DC converter 72 (shown in FIG. 2). The DC to DC converter 152 is used to control, or regulate, the voltage at the corresponding sub-set 24 (shown in FIGS. 1 and 2) of the electrical loads 16 (shown in FIGS. 1 and 2). For example, the DC to DC converter 152 may adapt the voltage to the needs of the corresponding sub-set 24 and/or the converter 152 may be used to short circuit the corresponding power converter module 26.

The DC to DC converter 152 includes two switches 186 and 190, two terminals 182 and 183, and a connection 174 (illustrated as a capacitor). The terminals 182 and 183 are configured to supply electrical power to the corresponding sub-set 24 of electrical loads 16 through the connection 174 when both switches 186 and 190 are open. The DC to DC converter 152 is configured to short circuit the corresponding power converter module 26 by closing either of the switches 186 or 190. However, in addition or alternative to the illustrated embodiment, the DC to DC converter 152 may include any other components, configurations, and/or the like that enable the DC to DC converter 152 to short circuit the corresponding power converter module 26.

Figure 5:
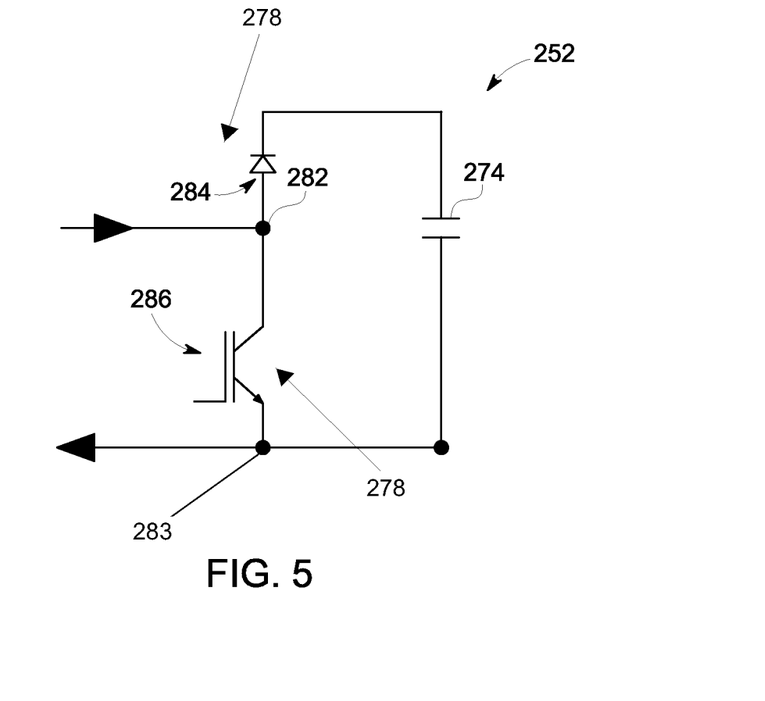
FIG. 5 is a circuit diagram illustrating another embodiment of a DC to DC converter for use with the system shown in FIG. 2.

FIG. 5 is a circuit diagram illustrating another embodiment of a DC to DC converter 252 for use within the power converter modules 26 (shown in FIG. 2). The DC to DC converter 252 is used to control, or regulate, the voltage at the corresponding sub-set 24 (shown in FIGS. 1 and 2) of the electrical loads 16 (shown in FIGS. 1 and 2). For example, the DC to DC converter 252 may adapt the voltage to the needs of the corresponding sub-set 24. Moreover, and for example, the DC to DC converter 252 may be used to short circuit the corresponding power converter module 26.

The DC to DC converter 252 includes a diode-switch pair 278, two terminals 282 and 283, and a connection 274 (illustrated as a capacitor). The diode-switch pair 278 includes a diode 284 and a switch 286. The terminals 282 and 283 are configured to supply electrical power to the corresponding sub-set 24 of electrical loads 16 through the diode 284 and the connection 274 when the switch 286 is open. The DC to DC converter 252 is configured to short circuit the corresponding power converter module 26 by closing the switch 286. However, in addition or alternative to the illustrated embodiment, the DC to DC converter 252 may include any other components, configurations, and/or the like that enable the DC to DC converter 252 to short circuit the corresponding power converter module 26.

Figure 6:
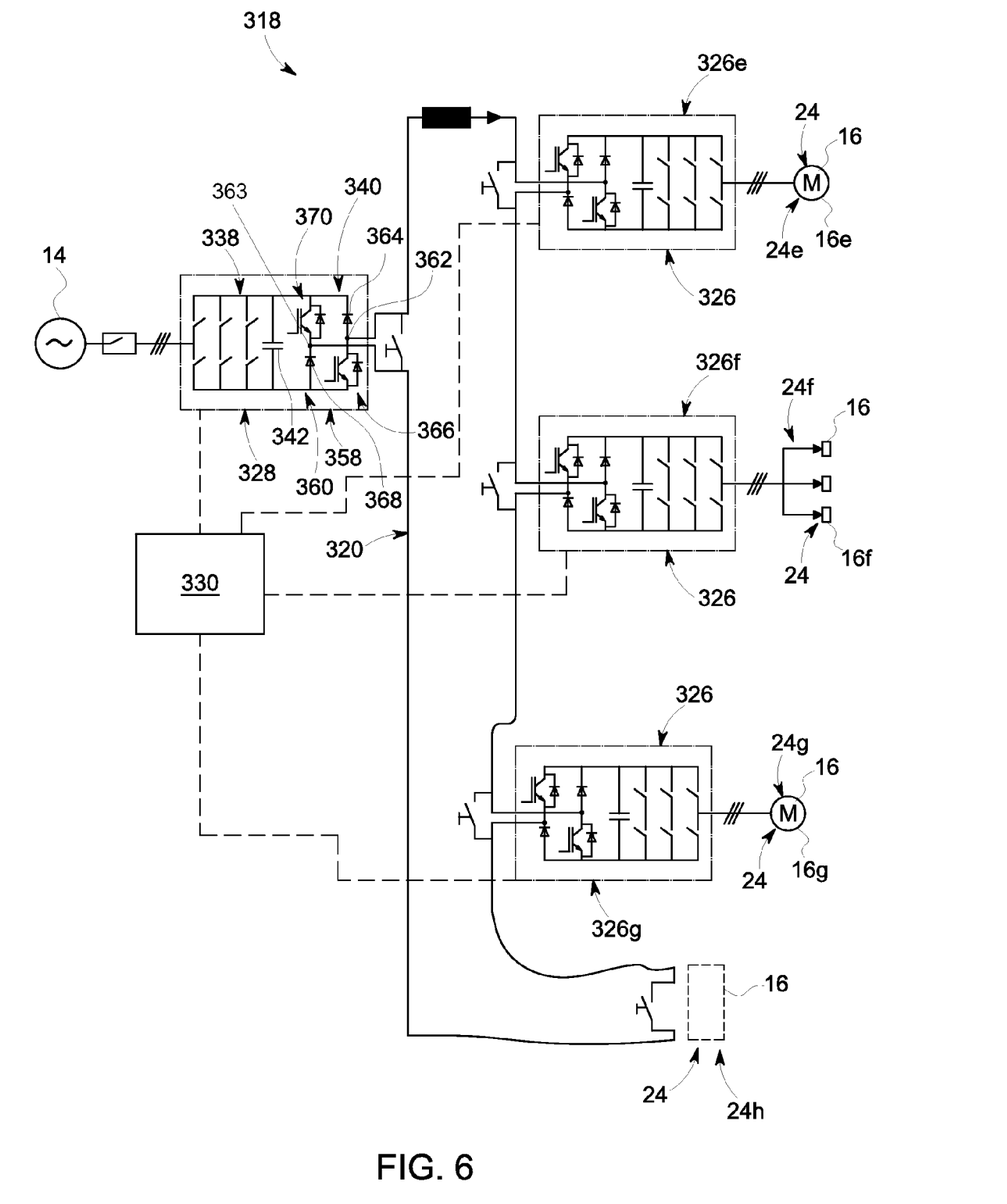
FIG. 6 is a circuit diagram illustrating another embodiment of a DC power distribution system of the aircraft shown in FIG. 1.

FIG. 6 is a circuit diagram illustrating another embodiment of a DC power distribution system 318. The system 318 includes a DC system bus 320, a power converter module 328, and one or more power converter modules 326. The system 318 may also include a controller 330. The power converter module 328 is electrically coupled between the source 14 and the DC system bus 320 for carrying electrical power from the source 14 to the DC system bus 320. The power converter modules 326 are electrically coupled in series to the DC system bus 320. The power converter modules 326 are electrically attached to corresponding sub-sets 24 of the electrical loads 16 for carrying electrical power from the DC system bus 320 to the electrical loads 16 of the corresponding sub-set(s) 24. The controller 330 may be electrically coupled to the DC system bus 320, the power converter module 328, and/or one or more of the power converter modules 326 for controlling operation thereof. The DC system bus 320 and the series couplings to the DC system bus 320 form a DC ring along which DC current flows.

The controller 330 may be configured to maintain an electrical current of the DC ring at a commanded value. At least one of the power converter modules 326 may be configured to be short circuited in response to a fault to bypass the supply of electrical power to the corresponding sub-set 24 of the electrical loads 16.

The power converter module 328 includes an AC to DC converter 338 and a DC to DC converter 340. A connection 342 (illustrated as a capacitor) electrically couples the converters 338 and 340 together. The AC to DC converter 338 is electrically coupled to the source 14 and converts the AC power received from the source 14 to DC power. The DC to DC converter 340 is electrically coupled to the DC system bus 320 for supplying the DC power converted by the AC to DC converter 338 to the DC system bus 320.

The DC to DC converter 340 is a bridge converter that includes two diode-switch pairs 358 and 360 and two terminals 362 and 363. The diode-switch pair 358 includes a diode 364 and a switch 366, while the diode-switch pair 360 includes a diode 368 and a switch 370. The terminals 362 and 363 are configured to supply electrical power to the DC system bus 320 through the diodes 364 and 368 when both switches 366 and 370 are open.

In the illustrated embodiment, the voltage supplied by the source 14 to the power converter module 328 is variable but the power converter module 328 delivers a substantially constant voltage to the DC system bus 320. Alternatively, the voltage supplied by the source 14 is substantially constant and/or the power converter module 328 delivers a variable voltage to the DC system bus 320. It is also possible, in some embodiments, that the voltage supplied by the source 14 to the power converter module 328 is variable and the power converter module 328 delivers a variable voltage to the DC system bus 320. The power converter module 328 may be referred to herein as a "source power converter module".

In illustrated embodiment, four sub-sets 24e-24h of electrical loads 16 are electrically coupled in series to the DC system bus 320. However, any number of sub-sets 24 may be electrically coupled to the DC system bus 320. The sub-sets 24e-24h are electrically coupled to the DC system bus 320 through corresponding power converter modules 326e-326g, respectively. In the illustrated embodiment, the sub-set 24e includes a single electrical load 16e that is an AC load, the sub-set 24f includes a plurality of electrical loads 16f that are AC loads, and the sub-set 24g includes a single electrical load 16g that is an AC load. The electrical loads 16f of the sub-set 24f are electrically coupled to the corresponding power converter module 326f in parallel relative to each other. The sub-set 24h represents one or more other (whether AC or DC) electrical loads 16 that may be electrically coupled in series to the DC system bus 320. The sub-set 24h may or may not be electrically coupled to the DC system bus 320 through a corresponding power converter module (not shown).

Figure 7:
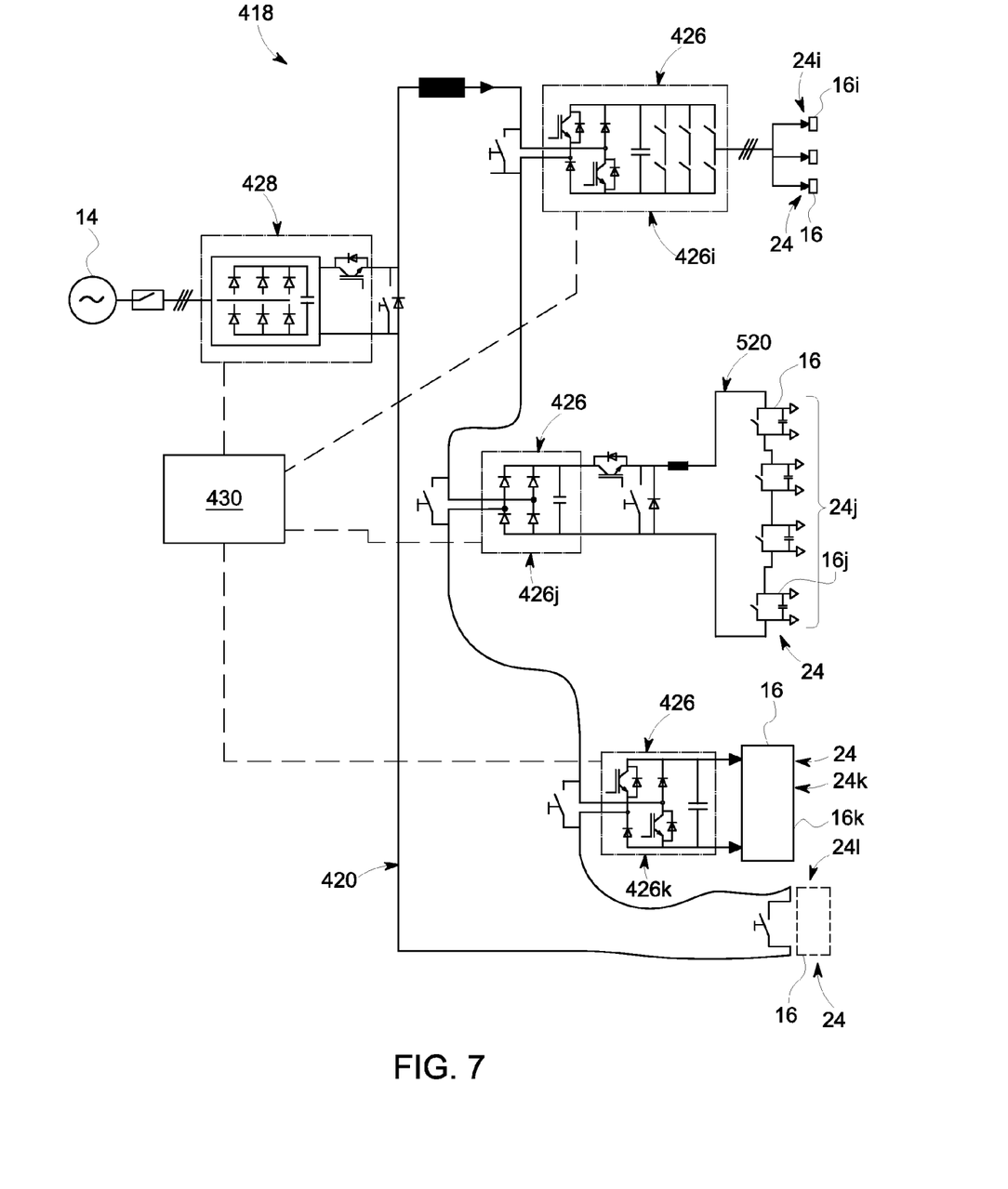
FIG. 7 is a circuit diagram illustrating another embodiment of a DC power distribution system of the aircraft shown in FIG. 1.

FIG. 7 is a circuit diagram illustrating another embodiment of a DC power distribution system 418. The system 418 includes a DC system bus 420, a power converter module 428, and one or more power converter modules 426. The system 418 may also include a controller 430. The power converter module 428 is electrically coupled between the source 14 and the DC system bus 420 for carrying electrical power from the source 14 to the DC system bus 420. The power converter modules 426 are electrically coupled between the DC system bus 420 and corresponding sub-sets 24 of the electrical loads 16 for carrying electrical power from the DC system bus 420 to the electrical loads 16. The controller 430 may be electrically coupled to the DC system bus 420, the power converter module 428, and/or one or more of the power converter modules 426 for controlling operation thereof. The DC system bus 420 and the series couplings to the DC system bus 420 form a DC ring along which DC current flows.

The controller 430 may be configured to maintain an electrical current of the DC ring at a commanded value. At least one of the power converter modules 426 may be configured to be short circuited in response to a fault to bypass the supply of electrical power to the corresponding sub-set 24 of the electrical loads 16.

In illustrated embodiment, four sub-sets 24i-24l of electrical loads 16 are electrically coupled in series to the DC system bus 420. However, any number of sub-sets 24 may be electrically coupled to the DC system bus 420. The sub-sets 24i-24k are electrically coupled to the DC system bus 420 through corresponding power converter modules 426i-426k, respectively. In the illustrated embodiment, the sub-set 24i includes a plurality of electrical loads 16e that are AC loads that are electrically coupled to the corresponding power converter module 426i in parallel to each other. The sub-set 24k includes a single electrical loads 16k that is a DC load. The sub-set 24l represents one or more other (whether AC or DC) electrical loads 16 that may be electrically coupled in series to the DC system bus 420. The sub-set 24l may or may not be electrically coupled to the DC system bus 420 through a corresponding power converter module (not shown).

The sub-set 24j includes a plurality of electrical loads 16j that are DC loads. Another DC system bus 520 is electrically coupled between the power converter module 426j and the sub-set 24j of the electrical loads 16j. The power converter module 426j and the electrical loads 16j of the sub-set 24j are electrically coupled in series to the DC system bus 520. The DC system bus 520 and the series couplings to the DC system bus 520 form a DC ring along which DC current flows. In some embodiments, the electrical loads 16j are electrically coupled to the DC system bus 520 using corresponding power converter modules (not shown). One or more controllers (not shown) may be electrically coupled to the DC system bus 520, the power converter module 426j, and/or one or more of the corresponding power converter modules of the electrical loads 16j. Each controller may be a separate component or may be a component of the power converter module 426j and/or a component of a corresponding power converter module of an electrical load 16j. The controller(s) may be configured to maintain an electrical current of the DC system bus 520 at a commanded value. In addition or alternatively, the controller 430 may be configured to maintain an electrical current of the DC system bus 520 at a commanded value. One or more of the corresponding power converter modules of the electrical loads 16j may be configured to be short circuited in response to a fault. Moreover, in some embodiments, each electrical load 16j includes a plurality of electrical loads.

Each of the switches described and/or illustrated herein (e.g., the switches 56, 66, 70, 86, 90, 186, 190, 286, 366, and 370) may be any type of switch, such as, but not limited to, gate turn-off thyristors (GTOs), insulated-gate bipolar transistors (IGBTs), and/or other transistors, among others. The power converter modules described and/or illustrated herein (e.g., the power converter modules 26, 28, and 328) may be a three phase power converter, such as, but not limited to, two level converters, three level converters, or a combination of two level converters and three level converters. Other examples include a higher number of levels.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A direct current (DC) power distribution system for an aircraft, the system comprising:
   a DC system bus configured to carry electrical power from an alternating current (AC) power source of electrical power to a plurality of electrical loads, the electrical loads being onboard the aircraft, the DC system bus comprising a load side;
   a source power converter module comprising an AC to DC converter and a DC to DC converter comprising two switches, the source power converter module being, configured to convert AC power to DC power and being electrically coupled in series to the DC system bus on a source side of the DC system bus and being electrically coupled to the source for supplying the DC system bus with DC power;
   a plurality of load power converter modules electrically coupled in series to the DC system bus on the load side of the DC system bus, the power converter modules being configured to be electrically attached to corresponding sub-sets of the electrical loads, wherein at least one of the load power converter modules is configured to be short circuited in response to a fault such that the at least one load power converter module does not supply electrical power to the corresponding subset of the electrical loads; and
   a controller electrically coupled to the DC system bus, the controller being configured to operate the two switches of the DC to DC converter of the source power converter module to maintain an electrical current of the DC system bus at a commanded value.

2. The DC power distribution system of claim 1, wherein the at least one load power converter module comprises a DC to DC converter that is configured to short circuit the at least one load power converter module, the DC to DC converter comprising two diode-switch pairs and two terminals, the terminals being configured to supply electrical power to the corresponding sub-set of the electrical loads when both of the switches of the diode-switch pairs are open.

3. The DC power distribution system of claim 1, wherein the at least one load power converter module comprises a DC to DC converter that is configured to short circuit the at least one load power converter module, the DC to DC converter comprising at least one switch and at least one terminal, the at least one terminal being configured to supply electrical power to the corresponding sub-set of the electrical loads when the at least one switch is open.

4. The DC power distribution system of claim 1, wherein the at least one load power converter module is configured to be short circuited in response to the fault without interrupting the flow of electrical current to the corresponding sub-set of the electrical loads.

5. The DC power distribution system of claim 1, wherein at least one other load power converter module is configured to supply electrical power to the corresponding sub-set of the electrical loads when the at least one load power converter module is short circuited.

6. The DC power distribution system of claim 1, wherein the load power converter modules comprise at least one DC to alternating current (AC) power converter module that is configured to convert DC power into AC power, the sub-set of the electrical loads that corresponds to the at least one DC to AC power converter module comprising at least one AC load.

7. An aircraft comprising:
an airframe;
a source of electrical power onboard the airframe;
a plurality of electrical loads onboard the airframe; and
direct current (DC) power distribution system according to claim 1.

8. The aircraft of claim 7, wherein the at least one load power converter module comprises a DC to DC converter that is configured to short circuit the at least one load power converter module, the DC to DC converter comprising, two diode-switch pairs and two terminals, the terminals being configured to supply electrical power to the corresponding sub-set of the electrical loads when both of the switches of the diode-switch pairs are open.

9. The aircraft of claim 7, wherein the at one least load power converter module is configured to be short circuited in response to the fault without interrupting the flow of electrical current to the corresponding sub-set of the electrical loads.

10. The aircraft of claim 7, wherein the load power converter modules comprise at least one DC to alternating current (AC) power converter module that is configured to convert DC power into AC power, the sub-set of the electrical loads that corresponds to the at least one DC to AC power converter module comprising at least one AC load.

11. The aircraft of claim 7, wherein at least one of the electrical loads is a DC load.

\* \* \* \* \*